United States Patent Office 3,294,751
Patented Dec. 27, 1966

3,294,751
POLYURETHANE COMPOSITIONS FROM UREIDO-POLYOLS
Burton D. Beitchman, Springfield Township, Delaware County, Pa., assignor to Air Products and Chemicals, Inc., Philadelphia, Pa., a corporation of Delaware
No Drawing. Filed Sept. 28, 1962, Ser. No. 227,076
2 Claims. (Cl. 260—75)

This invention relates to the preparation of polyurethane materials and particularly to the utilization of ureido-polyols as the low molecular weight organic polyol in a polyurethane composition.

Heretofore, it has been feasible to achieve high abrasion resistance, high tensile strength, and/or other desirable characteristics in a polyurethane elastomer having a relatively high hardness. However, compositions suitable for use as gaskets, material handling rolls and the like, which desirably are relatively soft, have not had the desired abrasion resistance, tensile strength and elongation.

In accordance with the present invention, a polyurethane composition is prepared by the interaction of an organic diisocyanate, a high molecular weight organic polyol and a low molecular weight ureido-polyol resulting from the reaction of an organic compound consisting of a hydrocarbon group having less than 10 carbon atoms and at least one isocyanato group, and an alkanol amine such as diethanol amine, diisopropanol amine, monoethanolamine, or monoisopropanolamine. The process of the present invention involves the reaction of a lower isocyanate with an alkanol amine to prepare a ureido-polyol. The polyurethane composition is prepared utilizing such ureido-polyol as the low molecular weight organic polyol employed in the interaction among the ingredients of the polyurethane-forming formulation.

The nature of the invention is further clarified by reference to a plurality of examples.

Example I

The ureido-diol conveniently designated as diethanol propyl urea was prepared by the dropwise addition of 9.3 g. (0.11 mol) of n-propyl isocyanate to 11.8 g. (0.11 mol) of diethanol amine. The resulting ureido-diol was mixed with a resinous diol prepared by the esterification of ethylene glycol and adipic acid. Such mixture contained about 200 g. (about 0.1 mol) of a hydroxy polyester having a molecular weight of about 2000 and a hydroxyl equivalent weight of about 1000. In order to remove any trace amount of water or other volatile impurities, the mixture was dehydrated at 105° C. for 30 minutes at an absolute pressure of 4 mm. of mercury. The thus dehydrated mixture was cooled under vacuum to 70° C. at which temperature a polyurethane-forming catalyst, 0.04 g. of triethylenediamine, was added, and the mixture was stirred under vacuum until the mixture had cooled to 60° C. During about 1 minute, 55.1 g. (0.22 mol) of a technical grade of diphenylmethane-4-4'-diisocyanate marketed as "Nacconate 300" (NCO/OH ratio of 1.05/1.00) was added while stirring the reaction mixture and maintaining the temperature under vacuum in the range from 55° C. to 80° C. The mixture was poured into preheated molds and stabilized by heating for 75 minutes at 105° C. The samples were removed from the molds and tested to provide the following data:

Tensile strength _____ 358 kg./cm.$^2$.
Durometer A _____ 61.
Percent elongation at break _____ 525.
Percent elongation set _____ 0.
100% modulus _____ 20 kg./cm.$^2$.
300% modulus _____ 41 kg./cm.$^2$.
Weight loss on test for abrasion resistance using H–18 wheel and 500 g. wheel ___ 0.1×10$^{-5}$ g. cycle.
Melting range _____ 212–222° C.

Example II

A polyurethane elastomer was prepared by: esterifying adipic acid with ethylene glycol to yield a hydroxy polyester; separating a fraction of such polyester having an average molecular weight of about 2000 and a hydroxyl equivalent weight of about 1000; mixing 12.5 g. of phenyl isocyanate with 14.9 g. of diisopropanolamine to prepare 27.4 g. (0.108 mol) of phenyl diisopropanol urea; preparing a mixture of said ethylene glycol adipate polyester and phenyldiisopropanol urea (approximately 1:1.1 molar ratio); degassing the mixture for 30 minutes at 100–110° C., at 3–4 mm. Hg absolute pressure; cooling to about 70° C.; mixing 0.02 g. triethylenediamine into the diol mixture; cooling mixture of catalyst and diol to about 60° C., adding 55.1 g. (0.22 mol) of a technical grade of diphenylmethane-4-4'-diisocyanate (Nacconate 300) and stirring for about one minute; pouring the reaction mixture into molds; and curing for 2 hours at 110° C. A similar procedure was followed to provide a control indicative of the effect of the ureido-group, using 19.7 g. (0.108 mol) diethanolaniline as the low molecular weight glycol instead of the ureido-glycol. The properties of the two elastomers were noted:

|  | Glycol | |
| --- | --- | --- |
|  | Diethanol Aniline | Phenyldiisopropanol Urea |
| Tensile kg./cm.$^2$ | 16.1 | 112 |
| Shore hardness A | 56 | 60 |
| Modulus 100% | 9 | 12 |
| Modulus 300% | 11 | 18 |

Thus, the use of the ureido-glycol permitted the attainment of a tensile strength about seven times as great as achieved from a similar glycol, even with products of similar hardness.

Example III

Following a procedure generally like that of the previous examples, the product resulting from the use of allyl diethanol urea was compared with a product employing polyethylene glycol (trimer-decamer range).

|  | Polyethylene Glycol | Allyldiethanol Urea |
| --- | --- | --- |
| Tensile kg./cm.$^2$ | 114 | 277 |
| Shore A hardness | 62 | 61 |
| Elongation break | 735 | 610 |

The superior tensile strength for a comparably soft product constitutes a significant advantage for the product derived from the ureido-glycol. Important advantages are obtained by including an unsaturated component, in the polyurethane-forming composition, inasmuch as the intermediate compositions may be subjected to a vulcanizing step to provide a cured article. Allyldiethanol urea is an especially advantageous component for such vulcanizable or heat curable polyurethane elastomers.

*Example IV*

Following methods and proportions substantially the same as in previous examples, a control elastomer prepared from a technical grade (PPG 425) of a polypropylene glycol having a formula approximately as $$HOCH(CH_3)CH_2(OC_3H_6)_7OC_3H_6OH$$

(i.e., the nonamer sometimes called nonapropylene ether glycol) was compared with the elastomer prepared from ethyldiisopropanol urea.

|  | PPG 425 | $C_2H_5NHCON(C_3H_6OH)_2$ |
| --- | --- | --- |
| Tensile kg./cm.² | 129 | 247 |
| Shore A hardness | 62 | 62 |
| Elongation break | 875 | 635 |
| Tear strength kg./cm | 103 | 133 |
| Modulus 100% | 181 | 235 |
| Modulus 300% | 218 | 364 |

It should be noted that the higher tensile strength achieved by the ureido-glycol is significantly advantageous.

*Example V*

Following the general procedures of previous examples, cured compositions are prepared and tested to evaluate formulations in which ureido-polyol is employed low or moderate molecular weight polyol component, and in which each of other factors is varied, whereby it is established that the ureido-polyols are useful and advantageous in a wide variety of formulations. Among the variables and ranges may be mentioned: polyetherglycols instead of polyesters; hydroxypolyesters prepared by interaction of diacids and polyglycols; triols, tetraols and hexaols instead of diols as the polyols; molecular weights from 800 to 2800 for the high molecular weight polyol; mol ratio of high molecular weight polyol to low molecular weight polyol from 0.2 to 1 to 1 to 0.2; degassing polyol mixture at temperature within 15–150° C. at 2 to 200 mm. mercury; employing any polyurethane catalyst composition within the usual ranges of concentration; employing organic compounds containing more than two isocyanato groups; employing polymers of isocyanates as the isocyanate reactant; employing any organic isocyanate customarily employed in polyurethane composition formulations; employing a unit ratio of isocyanato to hydroxyl groups (—NCO/—OH ratio) within the range from about 0.95 to about 1.20 by utilizing substantially equivalent amounts of the reactants, the isocyanto group being present in not more than a 20 mol percent excess and in a deficiency not more than 5 mol percent; controlling the time for mixing catalyst, polyol, and isocyanate before pouring into a mold to be sufficient to assure reasonably adequate mixing, but less than twenty minutes; and curing the cast composition at a temperature above atmospheric temperature and below its decomposition temperature for a period from 0.1 to 10 hours. Polyurethane compositions decompose when subjected to 225° C. for prolonged periods or to 300° C. for brief periods. The superiority of ureido-polyols in achieving a combination of advantageously low hardness and high tensile strength was established throughout a sufficient range of proportions and conditions that such superiority can be predicted for cast polyurethane elastomers generally.

By a series of tests it is established that the ureido-polyol must conform to the formula:

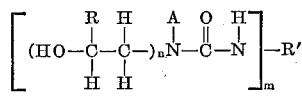

in which each R is selected from the group consisting of hydrogen and methyl, each of $n$ and $m$ is an integer less than 3, at least one of $n$ and $m$ being the number 2, and A is hydrogen when $n$ is 1, and R' is a hydrocarbon group having less than 10 carbon atoms.

When $m$ has a value of 2, the product is prepared by reaction of an organic diisocyanate such as tolylene diisocyanate with an alkanolamine. When tolylene diisocyanate reacts with 2 moles of diethanolamine, the resulting ureido-polyol is a tetraol, but a diol results from the controlled reaction of two moles of monoethanol amine per mole of tolylene diisocyanate. Similarly, a triol may be prepared from a mixture of monoisopropanolamine, diisopropanolamine, and tolylene diisocyanate.

In order to obtain linear polymers suitable for fibers and elastomers, the reactants should be overwhelmingly difunctional, but if rigid products (dense or foam) are desired, the proportion of reactants having three or more functional, groups may be increased to meet the specifications. A composition suitable for preparing door knobs, decorative plates, and the like is prepared by mixing:

Polyol resin—4500 centistokes at 100° F., tris (hydroxypropylpropyleneether) glycerol _____ 100
Reaction product of tolylene diisocyanate and 2 moles of diethanol amine
$CH_3C_6H_4[NHCON(CH_2CH_2OH)_2]_2$ _____ 30
Water soluble silicone surface tension modifier triethylene diamine _____ 1
TDI (NCO/OH ratio 1.1) _____ 60

The mixture of polyol and moderate molecular weight ureidopolyol is dehydrated at 105° C. for 30 minutes at 4 mm. pressure, cooled to 60° C., and the remaining ingredients added, and the mixture poured into preheated molds and stabilized by heating 30 minutes at 105° C. to provide satisfactorily strong rigid polyurethane plastic.

Obviously, many modifications and variations of the invention as hereinbefore set forth may be made without departing from the spirit and scope thereof, and therefore only such limitations should be imposed as are indicated in the appended claims.

What is claimed is:
1. The method of preparing a polyurethane article which consists essentially of the steps of: preparing a polyol urea by the interaction of a dialkanol amine having not more than 3 carbon atoms in the alkanol group with an organic compound having at least one but not more than two isocyanato groups, the organic group to which the isocyanato group is attached having at least three but not more than seven carbon atoms; mixing the resulting low molecular weight polyol urea with a viscous polyol having an average molecular weight 800 to 2800, the mol ratio of the viscous polyol to polyol urea being from 0.2 to 1 to 1 to 0.2 and said viscous polyol being selected from the group consisting of polyalkyleneetherpolyols and polyesters; incorporating a catalytic amount of polyurethane catalyst with the polyol mixture; adding to the catalyst-containing polyol mixture to an organic diisocyanato compound in which each cyanato group is attached to a mononuclear aromatic group, the —NCO groups of the diisocyanate being within the range from 95% to 120% of the —OH groups of the polyol mixture; heating the liquid mixture of polyol and diisocyanate to transform it into a polyurethane article; and heating the thus formed article at a temperature below 300° C. for a period from 0.1 to 10 hours to produce a polyurethane article having a tensile strength greater than an article prepared without the presence of a urea group in the low molecular weight polyol.

2. An article prepared in accordance with claim 1.

References Cited by the Examiner

UNITED STATES PATENTS

| 2,343,808 | 3/1944 | Schlack | 260—77.5 XR |
| 2,822,349 | 2/1958 | Muller et al. | 260—77.5 XR |
| 2,929,800 | 3/1960 | Hill | 260—75 XR |

LEON J. BERCOVITZ, *Primary Examiner.*

J. J. KLOCKO, *Assistant Examiner.*